United States Patent Office 2,778,801
Patented Jan. 22, 1957

2,778,801

STABILIZATION OF FORMALDEHYDE-HYDROGEN SULFIDE REACTION PRODUCTS

Earl L. Humphrey, Verona, and Willard B. Morse, New Kensington, Pa., assignors to Gulf Research & Development Company, Pittsburgh, Pa., a corporation of Delaware No Drawing. Application November 30, 1953, Serial No. 395,298

12 Claims. (Cl. 252—8.55)

This invention relates to the stabilization of formaldehyde-hydrogen sulfide reaction products, and more particularly it is concerned with the stabilization of aqueous oily liquid formaldehyde-hydrogen sulfide reaction products useful for inhibiting corrosive attack on metal equipment by aqueous well fluids containing sulfides, carbon dioxide or mixtures thereof.

In U. S. Patent 2,605,223 to Case, there are described liquid reaction products of hydrogen sulfide and an aqueous solution of formaldehyde, prepared under controlled conditions and stabilized against precipitation of solids by solution of the reaction products in a water-miscible oxygen-containing organic solvent.

As shown in the patent, the reaction products obtained by reacting an aqueous solution of formaldehyde and hydrogen sulfide at a temperature not exceeding about 80° F. and a reaction time not exceeding about 30 hours are aqueous oily liquids which are readily dispersed in well fluids and which effectively prevent the metal equipment in wells from corrosion by brines containing sulfides and/or carbon dioxide. These reaction products are relatively unstable and, on standing at ambient temperatures above 60° to 65° F. over a period ranging from several hours to about 25 days, they form solid wax-like products which are less desirable for well treating. However, the patent discloses that such liquid reaction products can be stabilized against solidification by adding thereto at least about 30 percent by volume of a water-miscible oxygen-containing organic solvent. Depending upon the specific solvents employed, significant increases in storage stability are obtained.

We have now found that a solution of an aqueous oily liquid reaction product as described and claimed in the above patent, that is, a solution in a water-miscible oxygen-containing organic solvent of a preformed aqueous oily liquid product of reaction, at a reaction temperature not exceeding about 80° F. and a reaction time not exceeding about 30 hours, of an aqueous solution of formaldehyde and hydrogen sulfide, said solution containing at least about 30 percent by volume of said solvent, can be further stabilized by the addition thereto of small stabilizing amounts of a compound selected from the group consisting of 1-acetyl-2-thiohydantoin, 2-benzothiazolyl hydrazine, o-dimethylaminomethyl-p-octyl phenol, and diphenylamine. The further stabilization achieved by this invention extends the stabilizing effect of the oxygen-containing organic solvents themselves, and renders commercially useful those solvents which, while exerting a stabilizing effect, do not stabilize the formaldehyde-hydrogen sulfide reaction products for sufficient periods.

The aqueous oily liquid reaction products of formaldehyde and hydrogen sulfide employed in our invention are prepared as disclosed in the above Case patent. In accordance therewith, an aqueous solution of formaldehyde of any suitable concentration, say 25 percent or 37 percent by weight, is reacted with hydrogen sulfide by bubbling the hydrogen sulfide therethrough at a rapid rate in large excess. The temperature of reaction is not permitted to exceed about 80° F. and is preferably maintained in the vicinity of 40° to 50° F. The time of reaction is not allowed to exceed about 30 hours. We prefer to employ a reaction time of between about 3 and 5 hours to obtain a gain in weight of the aqueous formaldehyde solution of about 15 percent.

As shown in the patent, substantially immediately after completion of the reaction, there is added to the aqueous oily liquid reaction product a water-miscible oxygen-containing organic solvent. Such solvents include methyl alcohol, ethyl alcohol, isopropyl alcohol, butyl alcohol, ethylene glycol, diethylene glycol, glycerol, ethylene glycol monomethyl ether, ethylene glycol monoethyl ether, ethylene glycol monobutyl ether, acetone, methyl ethyl ketone, dimethylal, ethylene glycol monoacetate, diethylene glycol monoethyl ether, diethylene glycol monobutyl ether, furfuryl alcohol, beta ethoxy ethyl acetate, dioxane and mixtures thereof. A particularly good mixture of solvents consists of equal amounts of acetone and dioxane. The amount of solvent added to the liquid reaction product is at least about 30 percent by volume. Amounts of solvent less than this will not exert any significant stabilizing effect in preventing the formation of solid precipitates from the liquid product. It is preferred to employ about 50 to 60 percent by volume of the solvent.

After preparation of the above-described solutions of the formaldehyde-hydrogen sulfide reaction product, we add thereto one of the stabilizing additives of this invention. All of these additives are soluble in such solutions. In general, the stabilization of such solutions against precipitation can be achieved by the addition thereto of from about 0.05 to 5 percent, preferably from about 0.2 to 1.0 percent, by weight of one of our stabilizing additives. The addition of 0.5 percent by weight of the additives produces excellent results.

In order to demonstrate the stabilizing effectiveness of the additives of our invention, we conducted the following tests. To a solution of 40 percent by volume of an aqueous oily liquid reaction product of formaldehyde and hydrogen sulfide in 60 percent by volume of acetone, prepared as will be described hereinafter, there was added 0.5 percent by weight of each of the stabilizing additives of this invention. In one series of tests, the solutions were placed in 4-oz. sample bottles and stored at room temperature while exposed to daylight in an east window. In another series of tests, simulating storage in steel drums, the solutions were placed in 2-oz. sample jars containing a 1020 cold-rolled steel strip. The ratio of the area of the steel surface to the volume of liquid was the same as encountered in a full 55-gallon steel drum. These samples were stored in the dark at room temperature. In both series of tests, the solutions were observed daily for a period of 4 weeks and less frequently thereafter. A slight precipitate forming in the solution was disregarded. A solution developing a moderate precipitate, defined as the amount of precipitate necessary to cover the bottom of the sample bottle, was considered to have failed. The time elapsed for formation of the moderate precipitate was taken as indicative of the storage stability of the test solution. The results are shown in the following table.

Storage stability tests

| Example No. | Make-up | Stability of Sample Days[1] | Stability of Sample Days[2] |
|---|---|---|---|
| 1 | Control[3] | 19 | |
| 2 | ----do---- | | 27 |
| | *Control [3] +0.5 wt. percent Inhibitor* | | |
| 3 | 1-acetyl-2-thiohydantoin | 42 | |
| 4 | ----do---- | | 62 |
| 5 | 2-benzothiazolyl hydrazine | 42 | |
| 6 | ----do---- | | 48 |
| 7 | o-dimethylaminomethyl-p-octyl phenol[4] | 26 | |
| 8 | ----do---- | | 42 |
| 9 | diphenylamine | 49 | |
| 10 | ----do---- | | 49 |

[1] Stored in partially filled 4-oz. sample bottles exposed to daylight in east window at room temperature.
[2] Stored in partially filled 2-oz. jars containing steel strip; stored in dark at room temperature. Simulated drum storage.
[3] Solution of 40 volume percent of formaldehyde-$H_2S$ reaction product in 60 volume percent acetone.
[4] The "octyl" substituent is alpha, alpha, gamma, gamma tetramethylbutyl.

The specific formaldehyde-hydrogen sulfide reaction product solution employed in the above tests was prepared as follows: Hydrogen sulfide was bubbled at a rapid rate through a commercial aqueous formaldehyde solution containing 25 percent by weight of formaldehyde. The temperature was maintained between 42° and 48° F., and the hydrogen sulfide was passed into the formaldehyde for a period of 4 hours. The gain in weight of the formaldehyde solution amounted to 15.2 percent. The aqueous oily liquid reaction product obtained was then dissolved in acetone in the proportion of 40 percent by volume of reaction product and 60 percent by volume of acetone.

The foregoing examples show the marked increase in storage stability achieved by our invention. Obviously, the other specific formaldehyde-hydrogen sulfide reaction products and other specific solvents, as disclosed herein, can be employed in place of those shown in the examples.

The stabilized solutions of formaldehyde-hydrogen sulfide reaction products of our invention are excellent corrosion inhibitors for down-the-hole treatment of wells where corrosive conditions are encountered, particularly in cases where the brines produced contain hydrogen sulfide, carbon dioxide or mixtures thereof. The further stabilization of the reaction products achieved by our invention permits the use of relatively cheap and readily available oxygen-containing solvents. Thus, not only is the useful life of the reaction products extended, but well treating costs are materially reduced.

We claim:

1. A composition of matter effective for inhibiting corrosive attack of metal equipment by aqueous well fluids containing sulfides, carbon dioxide or mixtures thereof which comprises a solution in a water-miscible oxygen-containing organic solvent of a preformed aqueous oily liquid product of reaction, at a reaction temperature not exceeding about 80° F. and a reaction time not exceeding about 30 hours, of an aqueous solution of formaldehyde and hydrogen sulfide, said solution containing at least about 30 percent by volume of said solvent, and said solution additionally containing a small amount, sufficient to retard the precipitation of solids from said solution, of a compound selected from the group consisting of 1-acetyl-2-thiohydantoin, 2-benzothiazolyl hydrazine, o-dimethylaminomethyl-p-octyl phenol, and diphenylamine.

2. The composition of claim 1, wherein said solvent is selected from the group consisting of methyl alcohol, ethyl alcohol, isopropyl alcohol, butyl alcohol, ethylene glycol, diethylene glycol, glycerol, ethylene glycol monomethyl ether, ethylene glycol monoethyl ether, ethylene glycol monobutyl ether, acetone, methyl ethyl ketone, dimethylal, ethylene glycol monoacetate, diethylene glycol monoethyl ether, diethylene glycol monobutyl ether, furfuryl alcohol, beta ethoxy ethyl acetate, dioxane and mixtures thereof.

3. The composition of claim 1, wherein the amount of said precipitation retarding compound ranges from about 0.05 percent to 5 percent by weight.

4. The composition of claim 1, wherein the precipitation retarding compound is 1-acetyl-2-thiohydantoin.

5. The composition of claim 1, wherein the precipitation retarding compound is 2-benzothiazolyl hydrazine.

6. The composition of claim 1, wherein the precipitation retarding compound is o-dimethylaminomethyl-p-octyl phenol.

7. The composition of claim 1, wherein the precipitation retarding compound is diphenylamine.

8. A composition of matter effective for inhibiting corrosive attack of metal equipment by aqueous well fluids containing sulfides, carbon dioxide or mixtures thereof which comprises a solution of 40 percent by volume of a preformed aqueous oily liquid product of reaction at a reaction temperature of 40° to 50° F. and a reaction time of from 3 to 5 hours of a 25 percent by weight aqueous solution of formaldehyde and hydrogen sulfide, 60 percent by volume of acetone and 0.5 percent by weight of a compound selected from the group consisting of 1-acetyl-2-thiohydantoin, 2-benzothiazolyl hydrazine, o-dimethylaminomethyl-p-octyl phenol, and diphenylamine.

9. The composition of claim 8, wherein the compound is 1-acetyl-2-thiohydantoin.

10. The composition of claim 8, wherein the compound is 2-benzothiazolyl hydrazine.

11. The composition of claim 8, wherein the compound is o-dimethylaminomethyl-p-octyl phenol.

12. The composition of claim 8, wherein the compound is diphenylamine.

References Cited in the file of this patent

UNITED STATES PATENTS 2,605,223    Case ---------------- July 29, 1952